United States Patent [19]

Tonosaki

[11] Patent Number: 5,635,948
[45] Date of Patent: Jun. 3, 1997

[54] DISPLAY APPARATUS PROVIDED WITH USE-STATE DETECTING UNIT

[75] Inventor: Satoshi Tonosaki, Tokyo, Japan

[73] Assignee: Canon Kabushiki Kaisha, Tokyo, Japan

[21] Appl. No.: 425,998

[22] Filed: Apr. 20, 1995

[30] Foreign Application Priority Data

Apr. 22, 1994 [JP] Japan ................................ 6-107871

[51] Int. Cl.⁶ ............................................. G09G 3/02
[52] U.S. Cl. ............................. 345/8; 345/156; 345/211
[58] Field of Search ................................. 345/211, 212,
345/7, 8, 9, 156, 159; 382/103, 104; 348/77,
78, 115, 117, 633, 634; 340/825.19; 341/21;
351/209, 210; 258/220, 221; 381/183, 187;
359/630

[56] References Cited

U.S. PATENT DOCUMENTS 4,768,088 8/1988 Ando ............................. 348/114
4,933,963 6/1990 Sato et al. ...................... 379/88
5,144,678 9/1992 Lenz ............................ 381/183

FOREIGN PATENT DOCUMENTS 2612355 9/1988 France ..................... H04N 7/120
3837620 4/1989 Germany ...................... 345/156

*Primary Examiner*—Kee M. Tung
*Assistant Examiner*—Doom Chow
*Attorney, Agent, or Firm*—Morgan & Finnegan, L.L.P.

[57] ABSTRACT

The present invention concerns a display apparatus, which comprises a display device for displaying image information for the both eyes of an observer, a use-state detecting device for detecting a use state and a non-use state about whether or not the observer is observing the display device, a power supply device for supplying power to each element in the display apparatus, and a device for controlling the power supply device, based on a signal from the use-state detecting device.

10 Claims, 14 Drawing Sheets

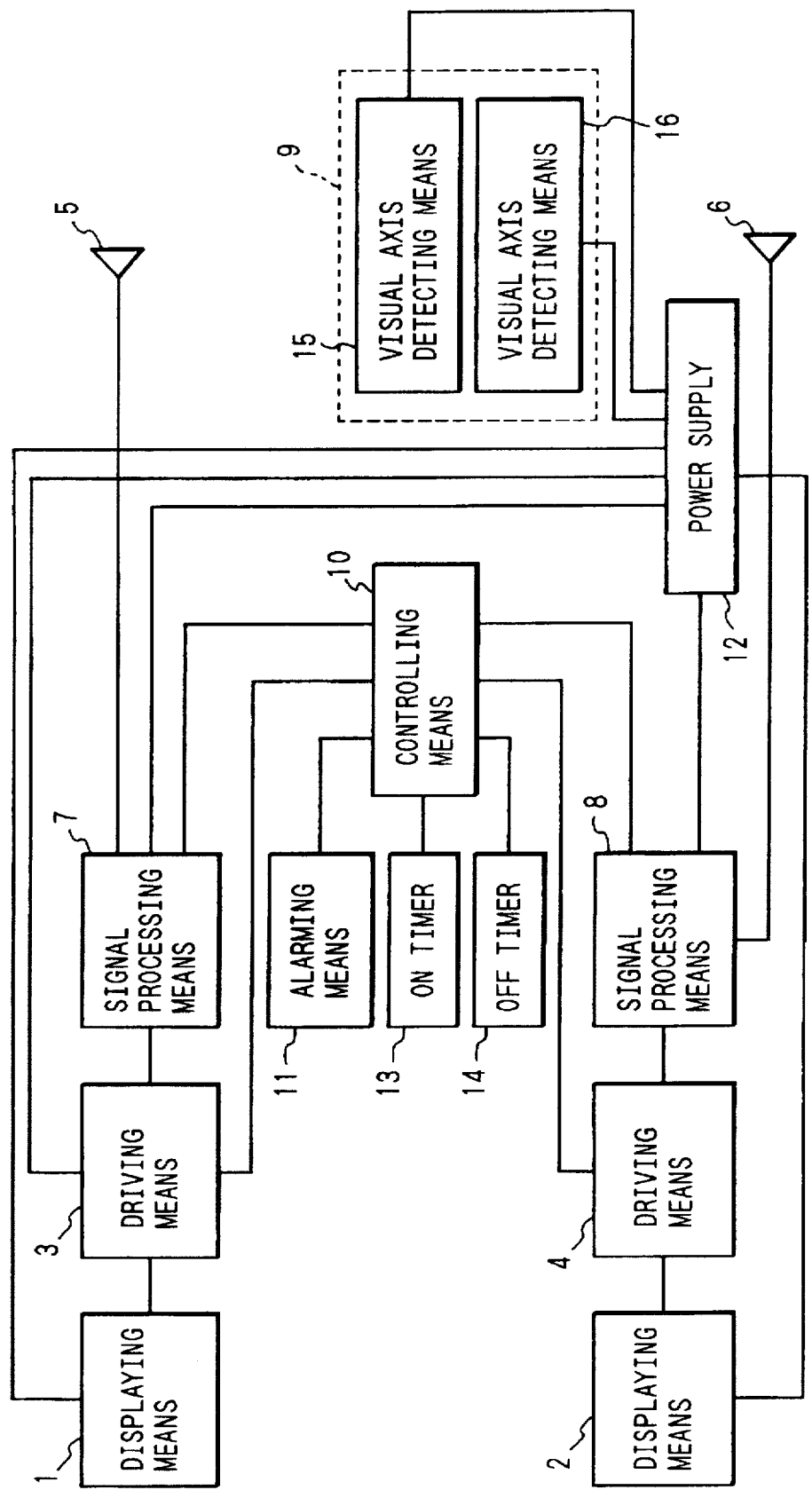

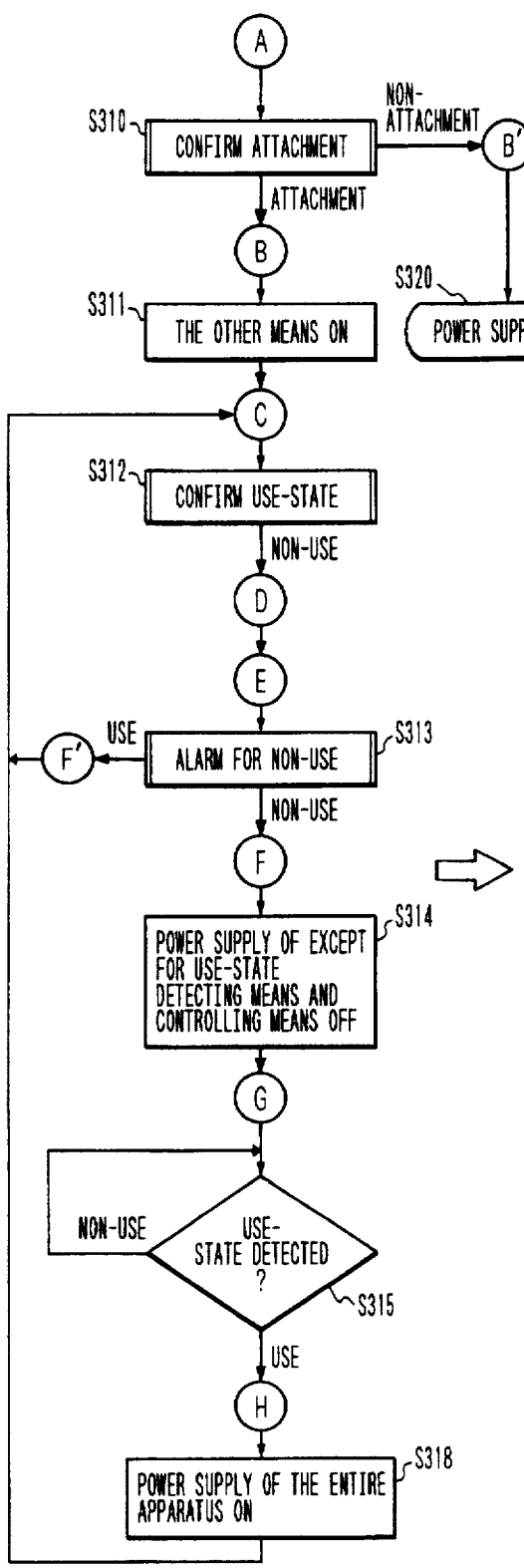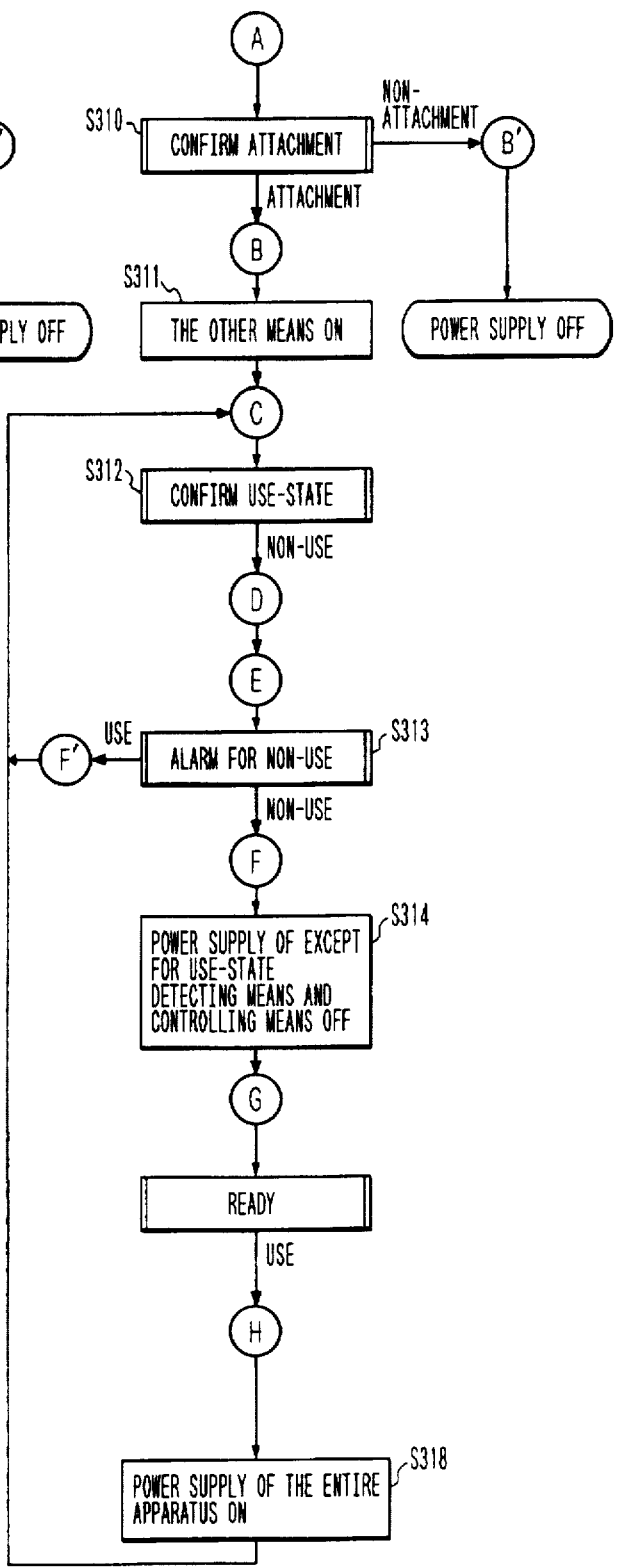

DISPLAY APPARATUS PROVIDED WITH USE-STATE DETECTING UNIT

BACKGROUND OF THE INVENTION

1. Field of the Invention

The present invention relates to a display apparatus, and more particularly to a display apparatus of an eyeglass type, a goggle type, or a helmet type as so called as a head mounted display, which is arranged to be mounted on the head of an information viewer (observer) and to guide image information displayed on a display means to the eyes of the information viewer, thereby letting the information viewer observe the image information.

2. Related Background Art

There have been proposed heretofore a variety of display apparatus which are arranged to be mounted on the head of information viewer and let the information viewer observe image information displayed on the display means. For example, such display apparatus were proposed in Japanese Laid-open Patent Applications No. 3-113412 and No. 3-113413. Besides, Japanese Laid-open Patent Application No. 59-117876 suggests a personal type display apparatus using a transmission type liquid crystal display as the display means. This application discloses a two-piece example of a goggle-type holding means and the main body and an all-in-one example of a cap-shape holding means in which all elements are built.

Since the display apparatus as a head mounted display is personally used as mounted on the head of information viewer, it is desirable that a portable power supply not requiring a power supply cord be used or that the entire apparatus be arranged as to be light in weight. Generally, decreasing the weight of the power supply results in decreasing the capacity of a battery.

The display apparatus using the personal type liquid crystal display had such a problem that if the apparatus was in a non-use state though the information viewer set the display apparatus on, for example when the viewer fell into a doze or when the viewer took off the display apparatus from the head, a power on state was maintained though the display apparatus was not viewed, thus wasting the power.

SUMMARY OF THE INVENTION

An object of the present invention is to provide a display apparatus which can prevent waste power dissipation, thereby effectively using the limited power supply capacity and which has an extended operate time, by such an arrangement that a non-use state in which an information viewer is not using the display apparatus is automatically detected and that in the non-use state the power supply is automatically interrupted to the entire apparatus or to some elements.

A further object of the invention is to provide a display apparatus with comfortable feeling of use, which is arranged in such a manner that even if the information viewer goes into the non-use state from the use state of display apparatus, for example when the viewer once falls into a doze while viewing image information or when the viewer once takes off the apparatus from the head, and if the viewer awakes or if the viewer again sets the display apparatus on the head, this state is detected to automatically restart the display apparatus, whereby the information viewer can immediately view the image information.

An aspect of the display apparatus of the present invention for achieving the objects is characterized in that the apparatus comprises:

display means for displaying image information for the both eyes of an observer;

use-state detecting means for detecting a use state and a non-use state about whether or not the observer is observing the display means;

power supply means for supplying power to each element in the display apparatus; and means for controlling the power supply means, based on a signal from the use-state detecting means.

A preferred form of the display apparatus is characterized in that the display apparatus is mounted on the head of the observer.

A preferred form of the use-state detecting means is characterized in that the use-state detecting means comprises means for detecting information concerning the eye of the observer.

A preferred form of the information detecting means is characterized in that the information detecting means comprises means for detecting reflected light from the cornea of the observer.

A preferred form of the use-state detecting means is characterized in that the use-state detecting means comprises means for detecting the use state a plurality of times at predetermined time intervals and determines the use state, based on a number of use states or non-use states detected.

A preferred form of the controlling means is characterized in that the controlling means starts supplying the power to all elements when the controlling means receives a signal indicating the use state from the use-state detecting means.

A preferred form of the display apparatus is characterized in that the display apparatus further comprises alarming means for generating an alarm signal to the observer, based on a signal indicating the use state from the use-state detecting means.

A preferred form of the display apparatus is characterized in that after the alarming means gives an alarm and when after a lapse of a predetermined time therefrom a signal of non-use state is obtained from the use-state detecting means, the controlling means stops the power supply from the power supply means to the all elements.

A preferred form of the display apparatus is characterized in that the display apparatus further comprises a main power switch and when the main power switch is turned on, the use-state detecting means performs use-state detection at the beginning.

Another aspect of the display apparatus of the present invention is characterized in that the display apparatus to be mounted on the head of an observer, comprises:

display means for displaying image information for the both eyes of the observer;

use-state detecting means for detecting a use state and a non-use state about whether or not the observer is wearing the display apparatus;

power supply means for supplying power to each element in the display apparatus; and means for controlling the power supply means, based on a signal from the use-state detecting means.

A preferred form of the controlling means is characterized in that the controlling means stops power supply to a preliminarily determined element when the controlling means receives a signal indicating the nonuse state from the use-state detecting means.

A preferred form of the controlling means is characterized in that the controlling means stops power supply to all elements when the controlling means receives a signal indicating the non-use state over a predetermined time from the use-state detecting means.

The display apparatus of the present invention will be described in detail with some embodiments in the following description.

BRIEF DESCRIPTION OF THE DRAWINGS

FIG. 1 is a block diagram of structure of Embodiment 1 of the present invention;

FIG. 5A is a third operation chart of Embodiment 1, and FIG. 5B is a summarized illustration of FIG. 5A;

DETAILED DESCRIPTION OF THE PREFERRED EMBODIMENTS

Figure 2A:
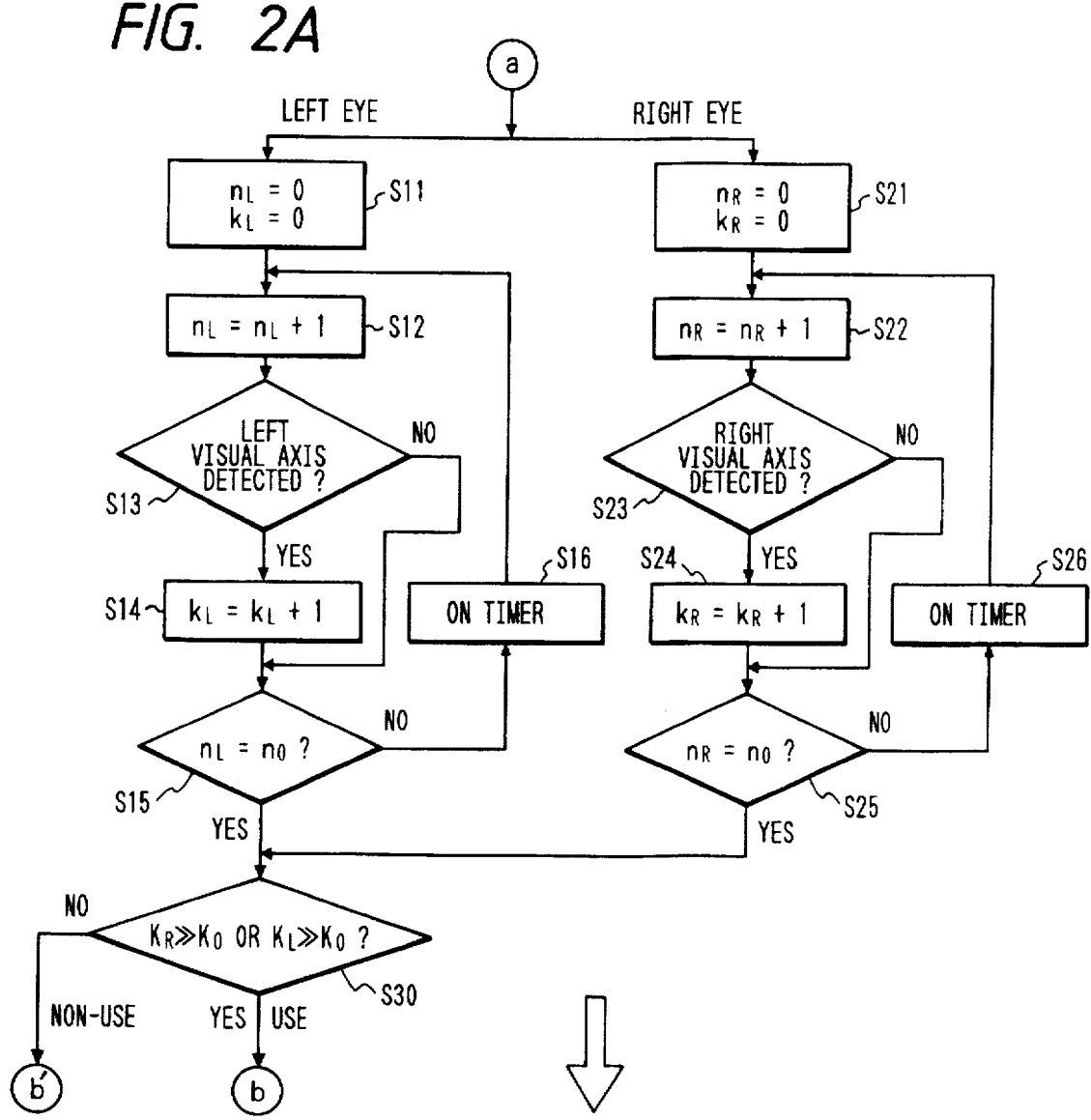
FIG. 2A is a detection flowchart of visual axis detecting means in the present invention.

FIG. 1 is a structural block diagram of Embodiment 1 of the present invention. In the drawing, numerals 1, 2 each designate display means, which are constructed of a liquid crystal display or the like for outputting image information corresponding to the left or right eye of an information viewer. Numerals 3, 4 denote drive means, which drive the corresponding display means 1, 2. Numerals 5, 6 each are image signal input means, which take in image signals to be displayed on the display means. Numerals 7, 8 each are signal processing means, which effect processing of gamma correction, color balance correction, etc. on the image signals input through the image signal input means 5, 6. Numeral 9 is use-state detecting means, which detects whether the display apparatus of the present invention is in a use state or in a non-use state.

In the case of the present embodiment, the use-state detecting means 9 detects the use state and the non-use state, using two visual axis detecting means 15, 16 arranged corresponding to the both eyes of the information viewer (who will be also called as an observer). Numeral 13 is an on-timer and numeral 14 is an off-timer. These timers are used with necessity for use-state detection of the use-state detecting means 9, and, for example, count a selected time preliminarily set. Among the timers, the on-timer 13 is used upon detection of the use state, while the off-timer 14 is used upon detection of the non-use state. Numeral 11 denotes alarming means, which generates an alarm, for example a sound etc., to the observer. Numeral 10 denotes controlling means, which controls supply of power to the respective portions in the apparatus, based on a use-state detection signal from the use-state detecting means 9, and also controls the other operations. Numeral 12 represents the power supply (power supply means), which supplies the power to the respective portions in the apparatus. The power supply is provided with a main power supply switch not shown. Here, the display means 1, 2 and the visual axis detecting means 15, 16 are installed on a display means mounting member (holding means) not shown.

The visual axis detecting means 15, 16 in the present embodiment employ the method for detecting the visual axis, for example as disclosed in Japanese Laid-open Patent Application No. 4-138431, in which infrared light is projected into the eyeball of information viewer and reflected light by the cornea thereof is detected, thereby detecting the visual axis. However, the direction of the visual axis does not have to be detected, but it is simply necessary to detect whether the eye is closed or opened.

FIG. 2A is a visual-axis detection flowchart of the visual axis detecting means 15 (16) in the present embodiment. The visual axis detection operation of the present embodiment is next described referring to this drawing.

The present embodiment is so arranged that if at least one of the two visual axis detecting means 15, 16 provided corresponding to the both eyes of information viewer, at least one visual axis detecting means detects the visual axis a preset number $k_O$ or more times out of a number $n_O$ of visual axis detection trials, the apparatus determines that the information viewer is viewing display surfaces of the display means (in the use state). On the other hand, if it is not so, that is, when neither number of visual axis detection times of the two visual axis detecting means 15, 16 reaches $k_O$, the apparatus judges that the information viewer is not viewing the display surfaces of the display means 1, 2 (in the non-use state).

In FIG. 2A, when the detection operation starts from step a, the visual axis detecting means first reset a number $n_L$ of left eye visual axis detection try times and a number $k_L$ of left eye visual axis detected times to 0 (step S11, hereinafter referred to as S11). Next, an increment of 1 is given to the number $n_L$ of left eye visual axis detection try times (S12), then detection of the left eye visual axis is performed (S13), an increment of 1 is given to the number $k_L$ of left eye visual axis detected times if the visual axis is detected (S14), and then the flow proceeds to S15. If the visual axis is not detected at S13, the flow directly proceeds to the processing of S15. At S15 it is determined whether the number $n_L$ of left eye visual axis detection try times reaches the preset number $n_O$, and if not, a lapse of a predetermined time is awaited (S16) and thereafter the flow returns to S12 to execute next visual axis detection. If the number $n_L$ of left eye visual axis detection try times reaches $n_O$ at S15, the flow proceeds to processing at S30.

On the other hand, the visual axis detecting means for the right eye performs right eye visual axis detection in the same flow as in the case of the left eye. When a number $n_R$ of right eye visual axis detection try times reaches $n_O$, the flow proceeds to the processing at S30. At S30 it is determined whether the number $k_L$ of left eye visual axis detected times is not less than the preset number $k_O$ or whether the number $k_R$ of right eye visual axis detected times is not less than the number $k_O$. If yes, it is determined that either eye of the information viewer is viewing the display means, thus concluding that the display apparatus is "being used (in the use state)." Then the flow goes to processing after step b. If no, it is determined that neither eye of the information viewer is viewing the display means, thus concluding that the apparatus is "not being used (in the non-use state)." Then the flow goes to processing after step b'.

Figure 2B:
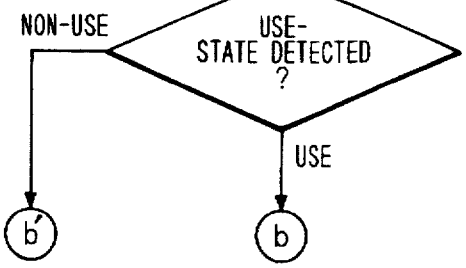
FIG. 2B is a summarized illustration of FIG. 2A.

Since the block from step a to steps b, b' in FIG. 2A is a part for detecting whether or not the information viewer is using the display apparatus, this part will be hereinafter simplified as a "use-state detection" step as shown in FIG. 2B, and the detection operation in this part will be called as "use-state detection."

Figure 3A:
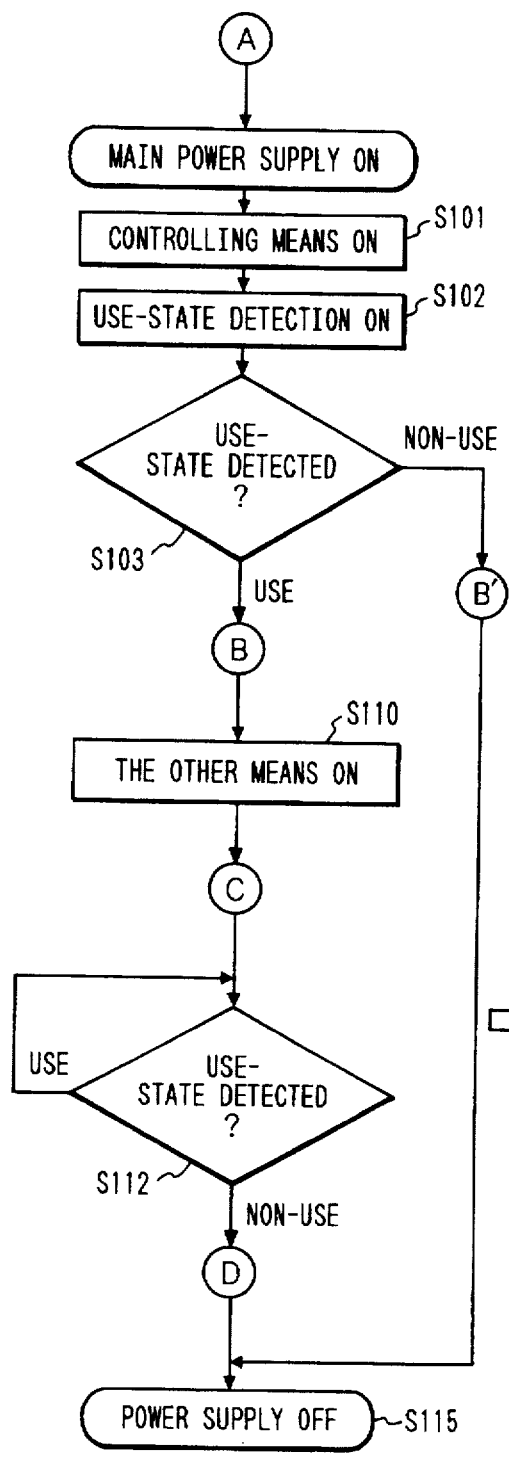
FIG. 3A is a first operation chart of Embodiment 1.

The operation of the present embodiment is next described. FIG. 3A is a first operation chart of Embodiment 1. First, the power is supplied to the controlling means 10 when the main power switch is turned on (S101); next, the controlling means 10 supplies the power from the power supply 12 to the use-state detecting means 9 (S102); whether or not the apparatus is in the use state is detected (S103). When the use state is detected (step B), the controlling means 10 controls the power supply 12 to supply the power to all other blocks (the elements of display means 1, 2, signal processing means 7, 8, etc.), thereby starting the entire display apparatus (S110).

Next, if the non-use state is detected upon use-state detection at S103 (step B'), it is determined that the display apparatus is surely not being used, and the controlling means 10 cuts off the power supply to the all constituent elements in the apparatus (S115).

After the entire display apparatus is started at S110 whereby the apparatus enters an operating state, the use-state detecting means 9 also continues executing the use-state detection, thus always detecting whether or not at least one eye of the information viewer is viewing the display means (S112). Once the non-use state is detected, the controlling means 10 cuts off the power supply to the all parts in the apparatus (S115).

Here, the power supply to the entire display apparatus is immediately intercepted whenever the main power switch is turned off during the operation of apparatus.

The present embodiment uses the controlling means 10 together with the use-state detecting means 9 having the two visual axis detecting means 15, 16. By this, the power supply to the entire apparatus is not made unless the information viewer is viewing the display surface of the display means by any of the both eyes at the start of use; or the power supply is automatically stopped immediately when neither of the both eyes is viewing the display means during operation of apparatus, thus preventing dissipation of power and extending the operate time of the display apparatus.

Figure 3B:
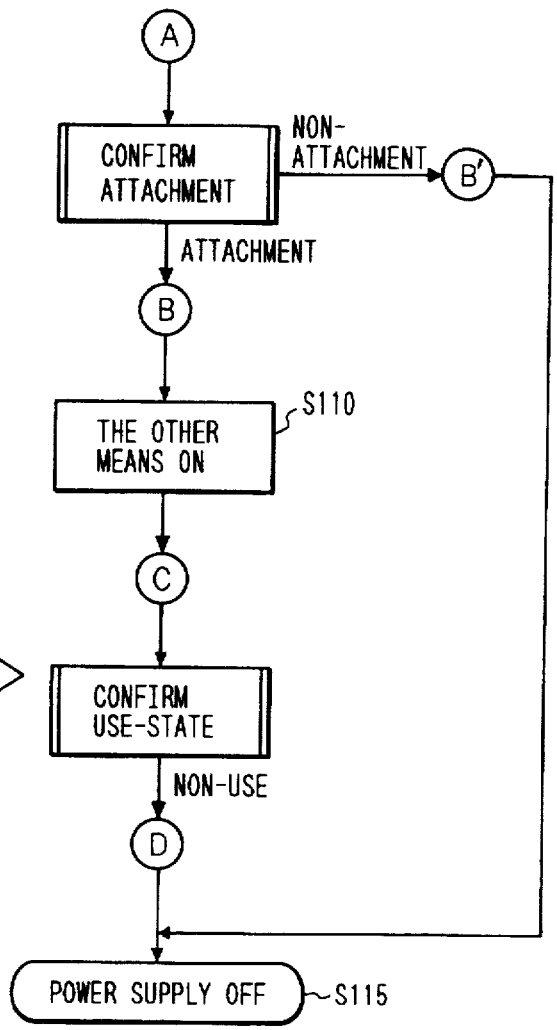
FIG. 3B is a summarized illustration of FIG. 3A.

Since the part from step A to step B and step B' in the flowchart of FIG. 3A is deemed as a step for determining whether or not the observer is surely viewing the display surfaces of the display means after putting the display means mounting member on prior to use of the display apparatus, this part is named as a step of "mount confirmation." Further, since the part from step C to step D is deemed as a step for confirming whether or not the apparatus is in the use state, this part is named as a step of "use-state confirmation." Accordingly, the flowchart of FIG. 3A can be expressed as in FIG. 3B.

Figure 4A:
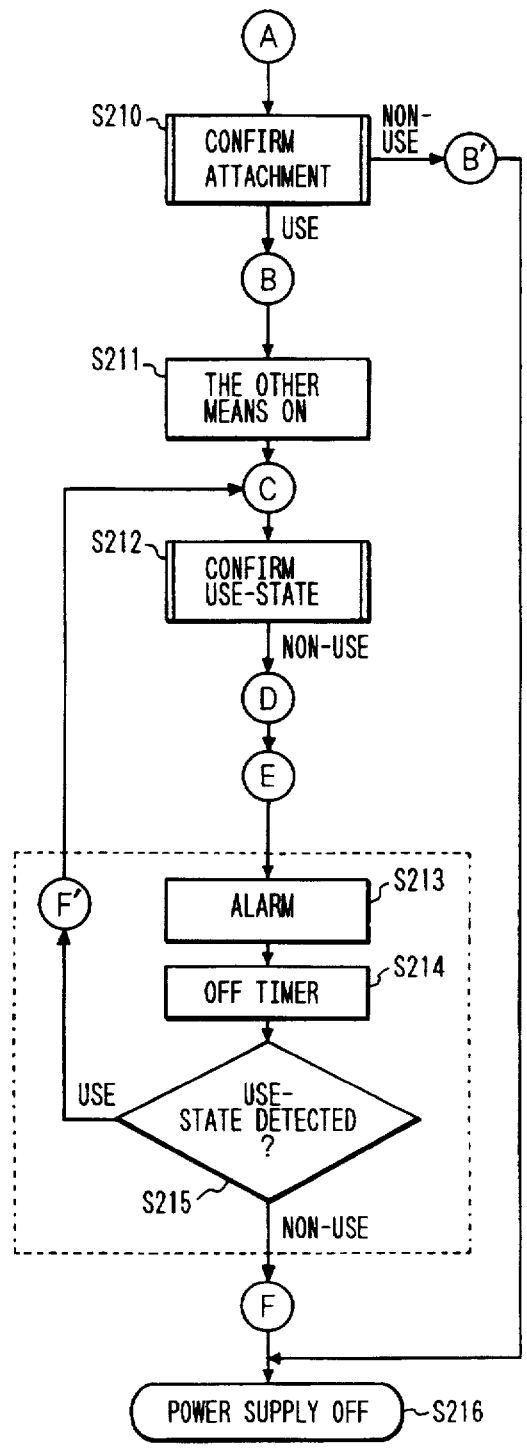
FIG. 4A is a second operation chart of Embodiment 1.

FIG. 4A is a second operation chart of Embodiment 1. In the present operation example, after completion of execution of the use-state confirmation step (S212), if the non-use state is determined, an alarm such as a sound is generated to give an alarm of non-use state to the observer (S213). At the same time the off-timer is started (S214); after a lapse of a predetermined time, the use-state detection is again performed by the use-state detecting means (S215); if the non-use state is again detected, the power supply to the entire apparatus is cut off (S216).

By the above arrangement, in the case of the second operation chart, if the information viewer closes the both eyes (for example, when the viewer falls into a doze), the apparatus calls viewer's attention; and if the information viewer is still not using the apparatus, the power supply is turned off, thus preventing dissipation of power.

Figure 4B:
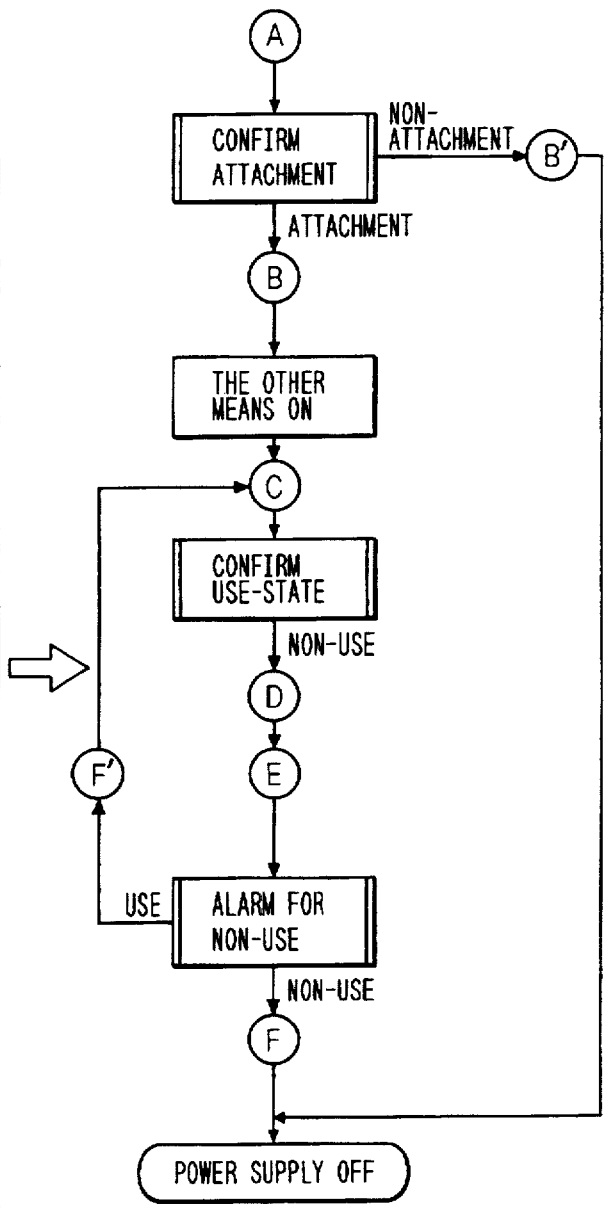
FIG. 4B is a summarized illustration of FIG. 4A.

Here, the part from step E to step F and step F' in FIG. 4A is deemed as a step for awaiting for a predetermined time after the alarm of the non-use state is given to the information viewer. Thus, this part is called as a step of "non-use alarming" as shown in FIG. 4B.

FIG. 5A is a third operation chart of Embodiment 1. In the present operation example, the step of use-state confirmation is executed (S312); thereafter, if the non-use state is determined, the non-use alarming step is executed (S313); if the non-use state still continues (step F), then the power supply is intercepted to the elements except for the use-state detecting means 9 and the controlling means 10 (S314). The use-state detecting means further continues the use-state detection after that (S315); if the use state is detected, the controlling means 10 immediately supplies the power to the entire apparatus (S318); whereby the entire apparatus is started and the operation step returns to step C.

By the above arrangement, in the case of the present embodiment, the apparatus calls viewer's attention when the information viewer closes the both eyes (or while the viewer is sleeping), and the power supply is cut off to the all elements other than the block related to the use-state detection if the information viewer is still not using the apparatus, thereby preventing dissipation of power; and the power supply to the entire apparatus is automatically started immediately when the apparatus again goes into the use state, enabling the viewer to continue viewing displayed images.

The part from step G to step H in FIG. 5A is deemed as a step for being ready for operation while dropping dissipation power. Thus, this part is called as a "ready" step as shown in FIG. 5B.

Figure 6:
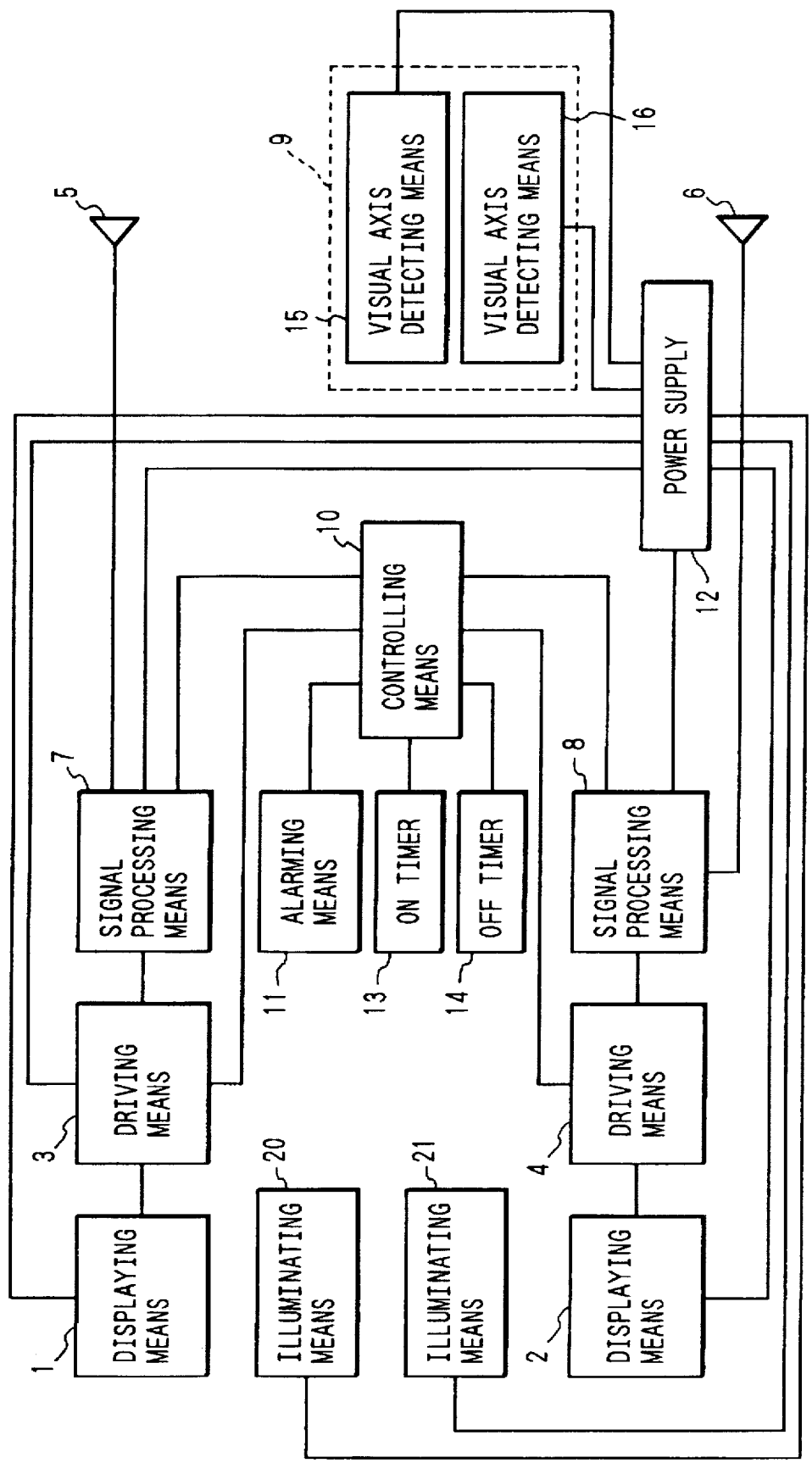
FIG. 6 is a block diagram of structure of Embodiment 2 of the present invention.

FIG. 6 is a structural block diagram of Embodiment 2 of the present invention. The present embodiment is constructed substantially in the same structure as Embodiment 1 of FIG. 1 except that the transmission-type liquid crystal is used as the display means and that illuminating means 20, 21 are provided for illuminating the liquid crystal. In the case of the present embodiment with the illuminating means, the power dissipation of the illuminating means is especially high, and, therefore, proper control of the illuminating means is especially done for curtailing the quantity of power dissipation.

Figure 7:
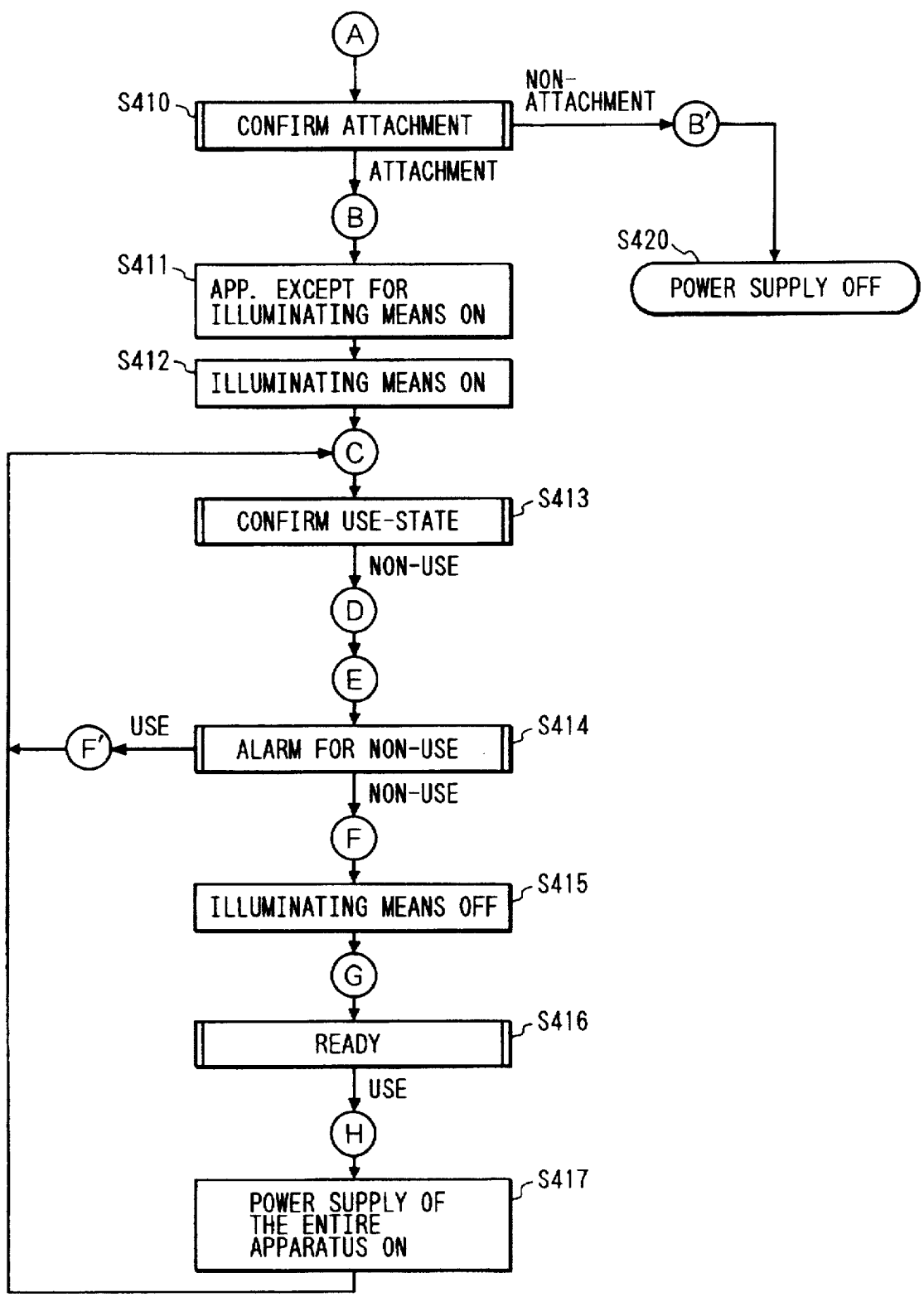
FIG. 7 is an operation flowchart of Embodiment 2.

FIG. 7 is an operation flowchart of the present embodiment. In the case of the present embodiment, when the main power switch is turned on, the mount confirmation step is first executed (S410); after mount is confirmed (step B), the power is first supplied to the all blocks except for the illuminating means 20, (S411); further, after a lapse of a predetermined time, the power is supplied to the illuminating means 20, 21 (S412), whereby the illuminating apparatus goes into an operating state.

After the display apparatus goes into the operating state, the step of use-state confirmation is executed (S413); if the non-use state is determined, the non-use alarming step is next executed to call attention of information viewer (S414). If the non-use state is still determined even with the alarm, the controlling means 10 intercepts the supply of power to the illuminating means 20, 21 (S415). After that, the apparatus goes into the ready step (S416). If the use state is detected (step H), the controlling means 10 immediately supplies the power to the entire display apparatus (S417), thereby starting the apparatus and then returning to step C.

As described above, the present embodiment lowers the power dissipation before use by supplying the power to the illuminating means after mount is first confirmed, and further makes inconspicuous disturbance of image upon actuation of liquid crystal display, likely to occur if a common electrode is unstable, by supplying the power to the display means 1, 2 of liquid crystal after start of the power supply to the illuminating means 20, 21.

Further, after the display apparatus is once brought into the operating state and if the apparatus goes into the non-use state because the information viewer is sleeping, an alarm is given and thereafter the apparatus goes into the ready state while lowering the power to the illuminating means, thus saving the dissipating power. Once the information viewer again starts viewing the display, the apparatus immediately turns into a state that displayed images can be viewed.

The present embodiment employs the transmission type liquid crystal as the display device, but the invention can be similarly applied to cases using reflection type display devices necessitating the illuminating means.

It is noted that the present embodiment can be operated according to either one of the first to third operation charts in Embodiment 1.

Figure 8:
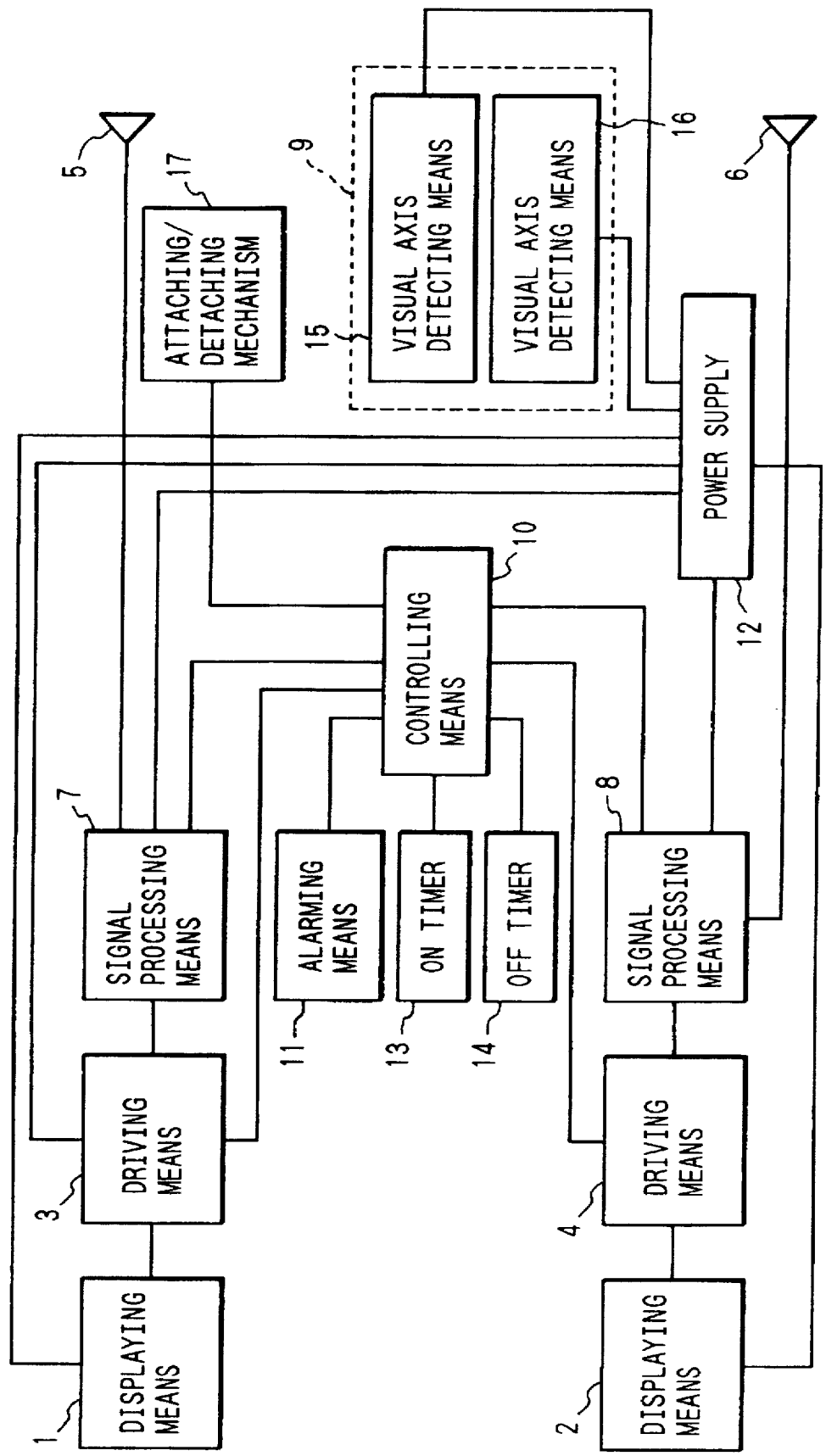
FIG. 8 is a block diagram of structure of Embodiment 3 of the present invention.
Figure 9A:
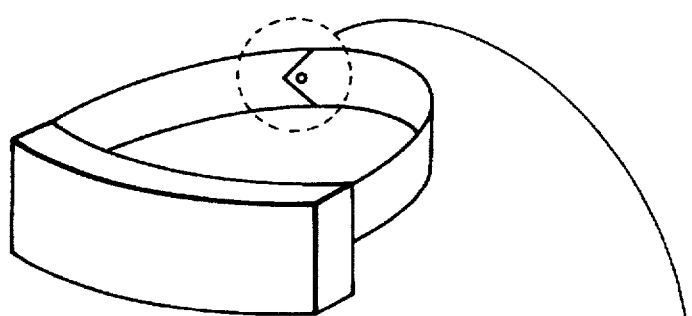
FIGS. 9A, 9B, and 9C are explanatory drawings of major part of a display means mounting member in Embodiment 3.
Figure 9B:
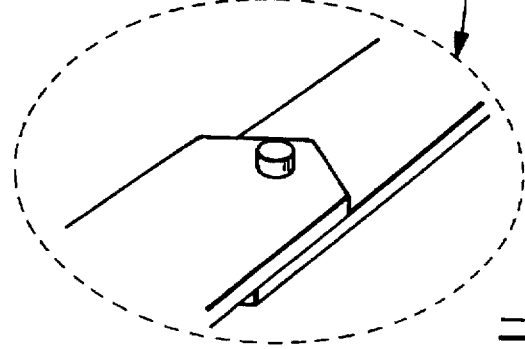
Figure 9C:
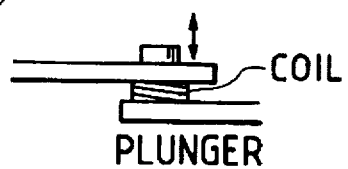
Figure 10:
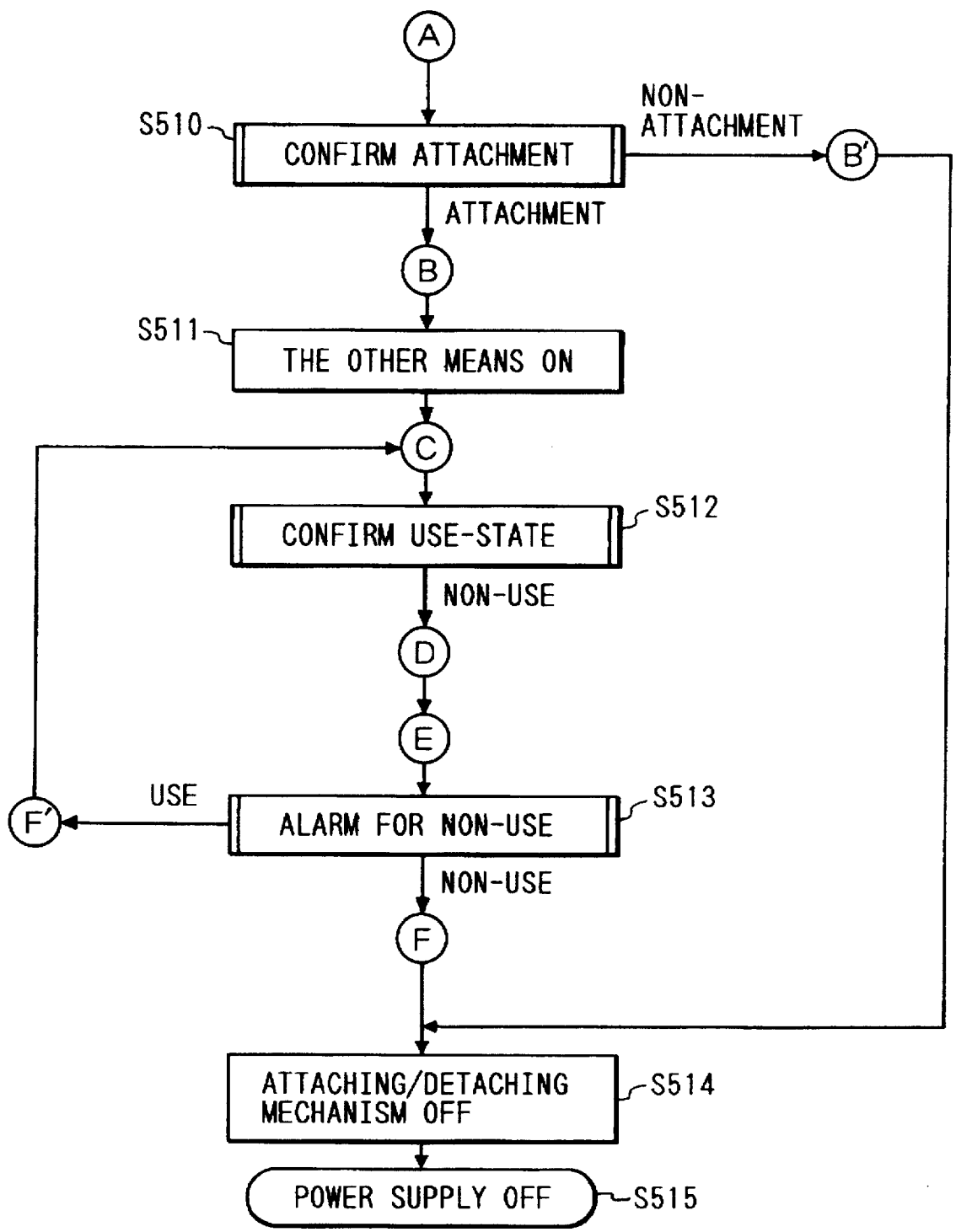
FIG. 10 is an operation flowchart of Embodiment 3.

FIG. 8 is a structural block diagram of Embodiment 3 of the present invention, FIGS. 9A, 9B, and 9C are explanatory drawings of major part of a display means mounting member in FIG. 8, and FIG. 10 is an operation flowchart of Embodiment 3 of the present invention. The present embodiment is different from Embodiment 1 of FIG. 1 in that an attaching/detaching mechanism 17 composed of a coil and a plunger etc. shown in FIG. 9C is provided in the display means mounting member shaped in a head band form as shown in FIG. 9A.

The operation of the present embodiment is described referring to FIG. 10. After the display apparatus goes into the operating state (step C), the step of use-state confirmation is executed (S512). When the step confirms the non-use state, the step of non-use alarming is executed (S513); if the non-use state continues, the controlling means 10 energizes the coil part in the attaching/detaching mechanism 17 so as to actuate the attaching/detaching mechanism 17 to release the locking part of the head band (S514); and then the power supply to the all members is cut off (S515).

The present embodiment is so arranged that using the visual axis detecting means 15, 16 as the use-state detecting means 9 and also using the attaching/detaching mechanism 17, the power supply is automatically stopped to prevent dissipation of power, for example, when the information viewer falls into a doze during operation of apparatus; and at the same time the display means mounting member is freed from a state tightening the head, thereby making the information viewer comfortable.

Figure 11:
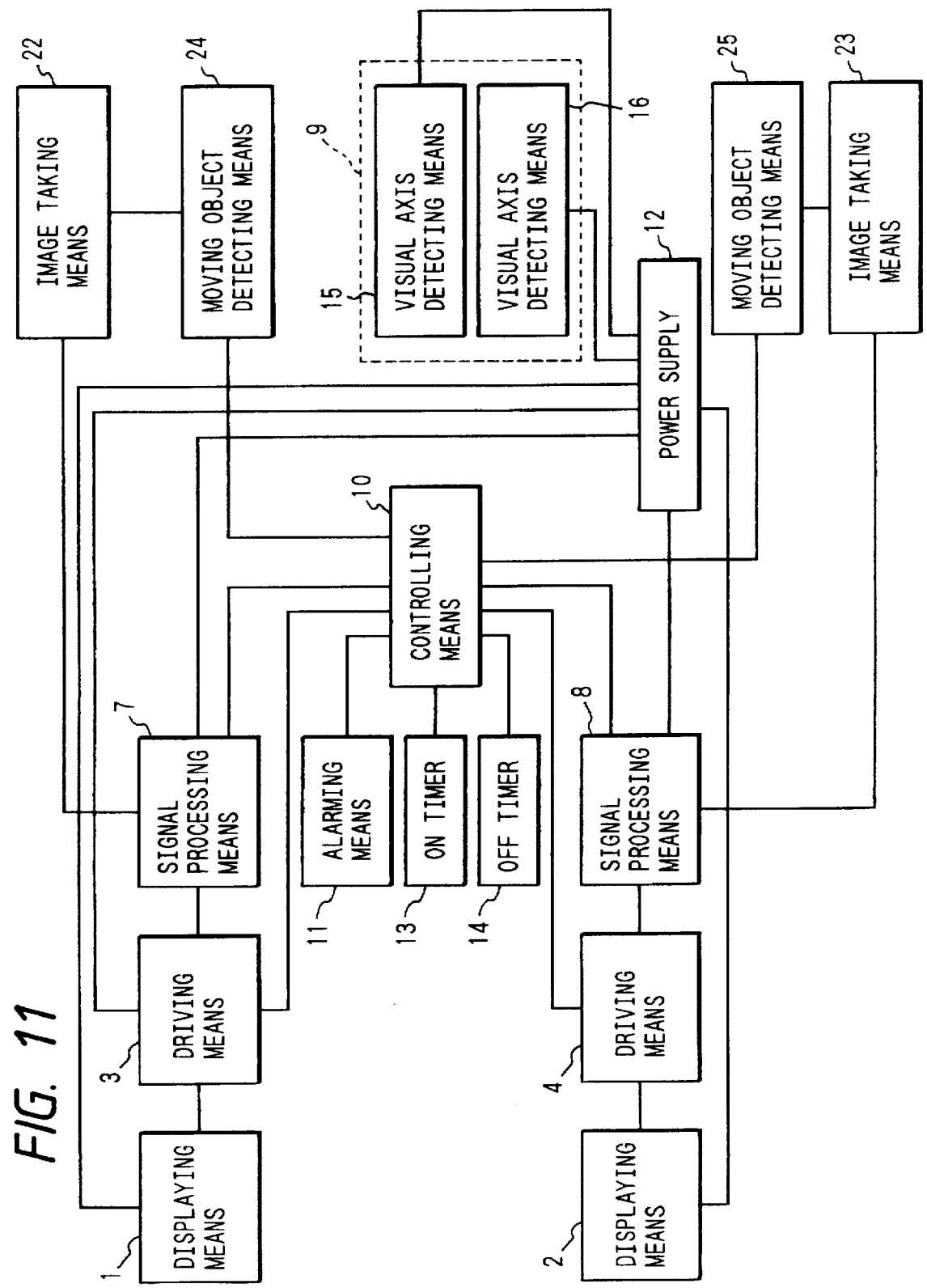
FIG. 11 is a block diagram of structure of Embodiment 4 of the present invention.
Figure 12:
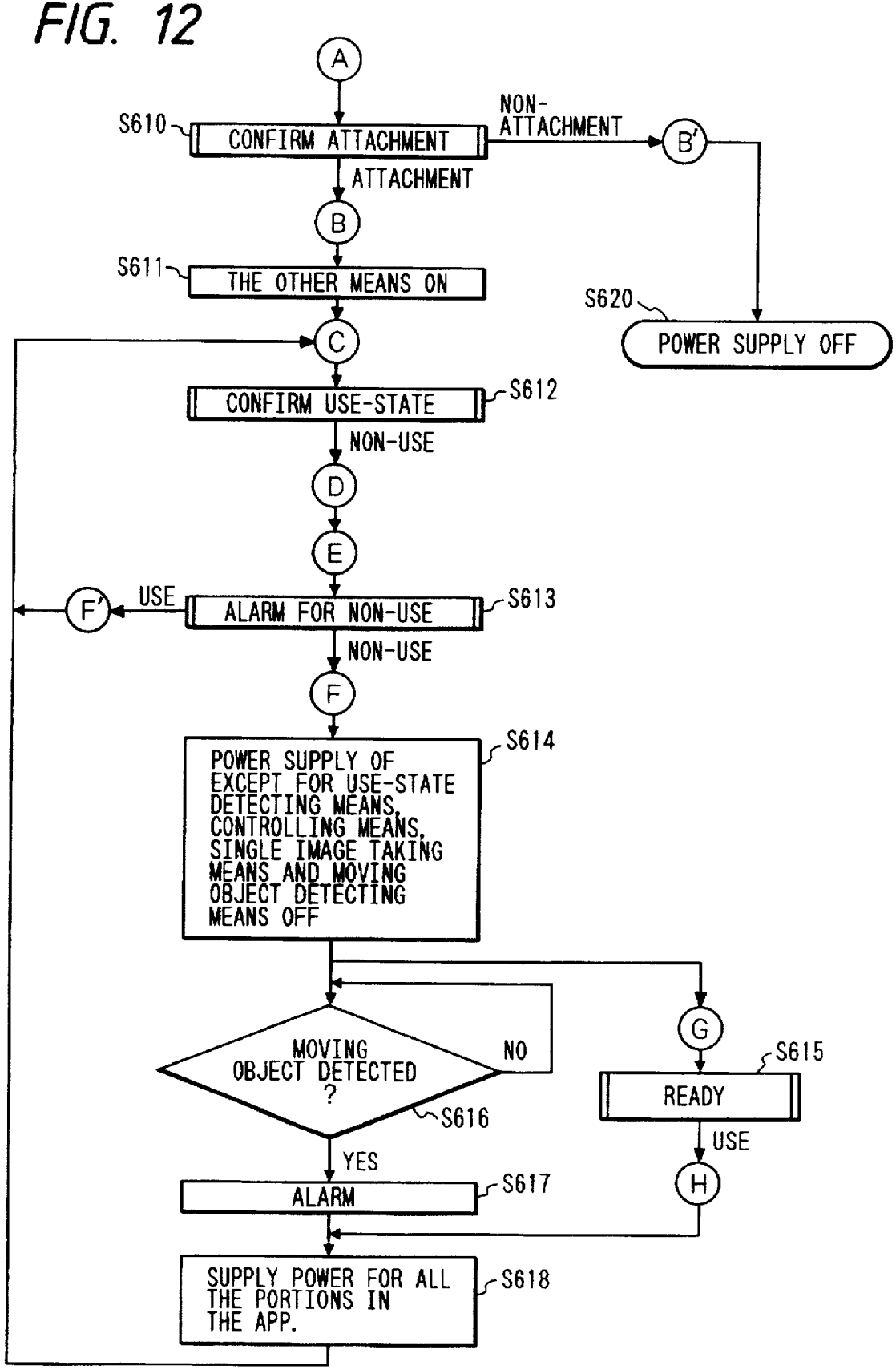
FIG. 12 is an operation flowchart of Embodiment 4.

FIG. 11 and FIG. 12 are a structural block diagram and an operation flowchart of Embodiment 4 of the present invention. The present embodiment is different from the structure of Embodiment 1 in that there are added image taking means 22, 23 and moving object detecting means 24, 25 for detecting a subject in motion from image information obtained through the image taking means 22, 23. The moving object detecting means 24, 25 in the present embodiment detect a moving object in an image by obtaining a correlation between a current image and an image a field before (by the field matching method).

The operation of the present embodiment is next described referring to FIG. 12. After the display apparatus goes into the operating state, the step of use-state confirmation is executed (S612). Then, if the non-use state is confirmed, the step of non-use alarming is executed (S613); then, if the non-use state is still determined after alarming, the controlling means 10 intercepts the power supply to the elements in the display apparatus except for the controlling means 10, the use-state detecting means 9, at least one image taking means, and the moving object detecting means (S614). Then the flow goes into the ready step (S615).

The image taking means under operation takes images of surroundings around the information viewer while the apparatus is in the ready step, and the moving object detecting means detects a moving object, using video signals from the taking means (S616); an alarm is generated for observer when a moving object is detected (S617); then the power is supplied to the portions having been kept in the power off state (S618), thereby starting the all elements in the display apparatus and then returning to step C.

As described above, the present embodiment is so arranged that for example, if the information viewer falls into a doze during the operation of the present display apparatus, the power supply to the major part is interrupted so as to suppress dissipation of power; at the same time, if a moving object appears in the field of the image taking means or if the information viewer again starts viewing the display means, the display apparatus is immediately restarted.

Figure 13:
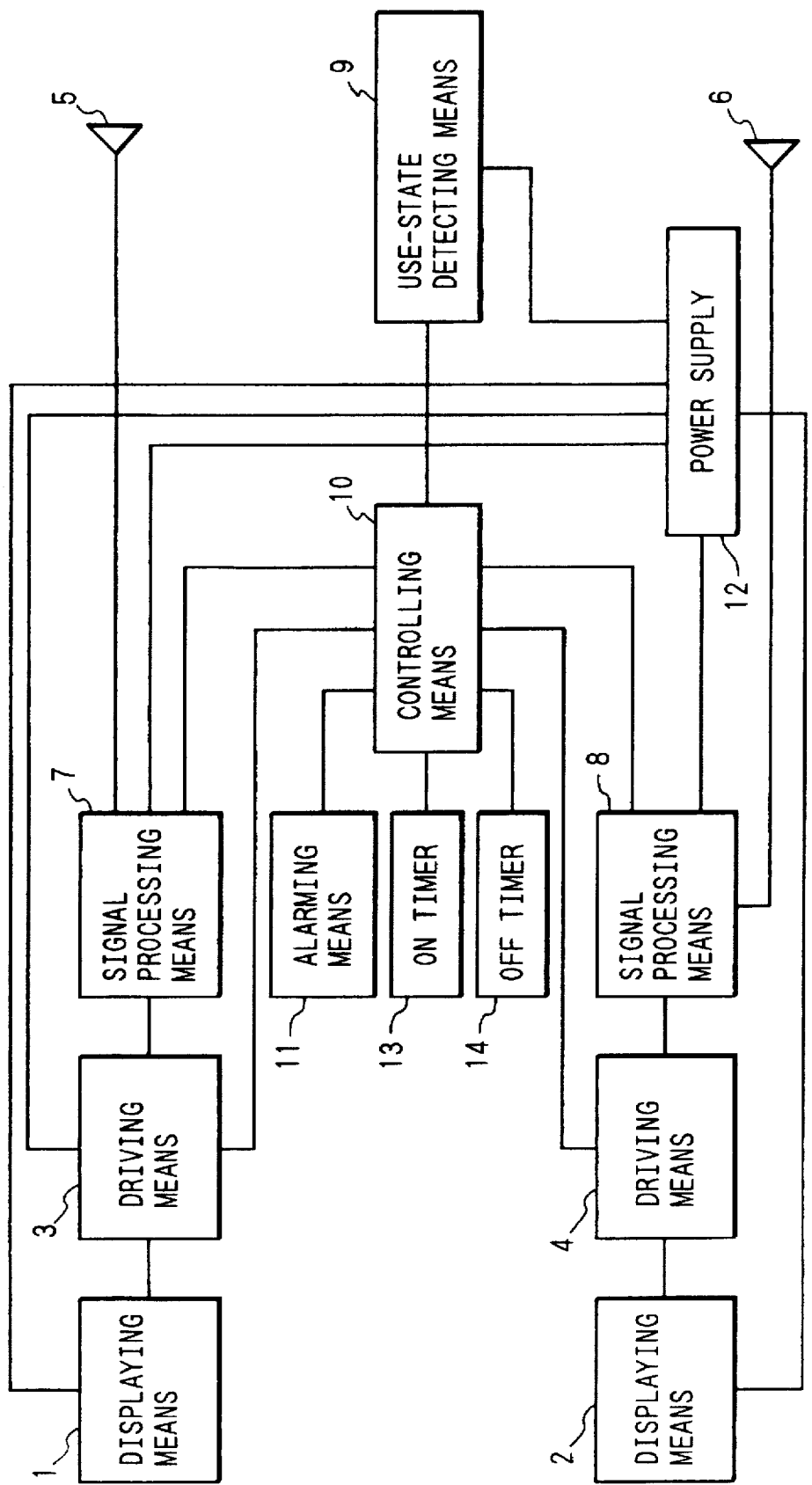
FIG. 13 is a block diagram of structure of Embodiment 5 of the present invention.

FIG. 13 is a structural block diagram of Embodiment 5 of the present invention. The present embodiment is different from Embodiment 1 only in the structure of the use-state detecting means 9, and the other structural blocks are the same as those in Embodiment 1.

Figure 14A:
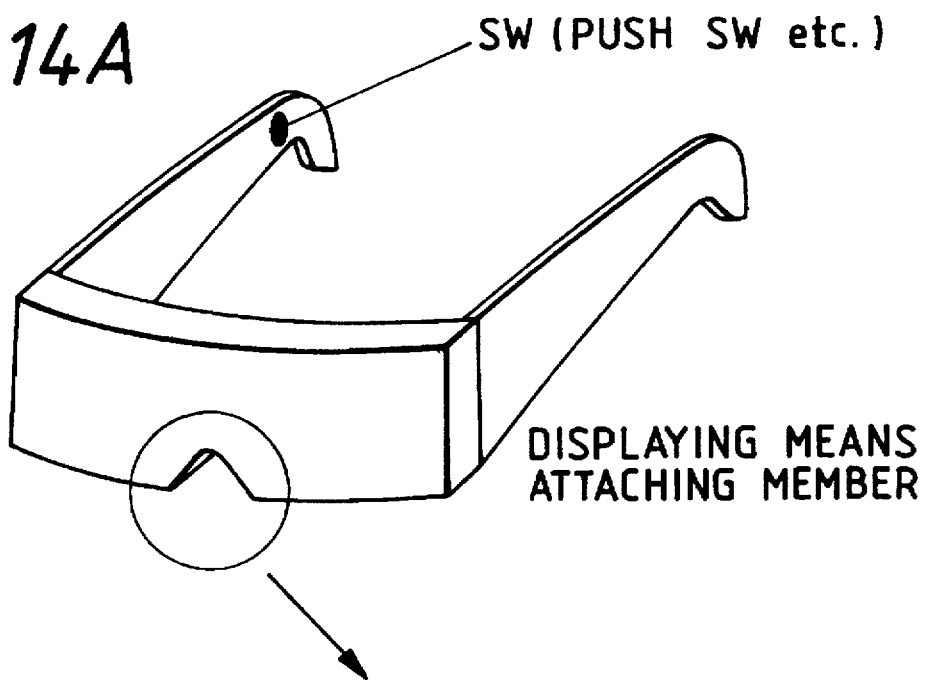
FIGS. 14A and 14B are explanatory drawings of major part of a display means mounting member in Embodiment 5.
Figure 14B:
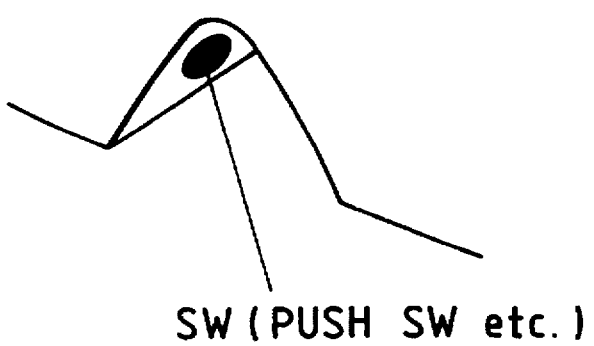

In the present embodiment, the display means mounting member (holding means) on which the display means is installed is formed in an eyeglass shape as shown in FIG. 14A. The use-state detecting means 9 in the present embodiment has switch means, for example a mechanical switch such as a push switch or a plate spring switch; an electric switch such as a touch sensor; an optical switch such as a photo reflector or a photo interrupter, etc., in a portion where the display means mounting member is in contact with the head of the information viewer as shown in FIG. 14B (for example, an inside portion of a temple or a portion of a nose pad), whereby it is detected whether the display means mounting member is in contact with the head of the information viewer over a predetermined time. If yes, it is determined that the apparatus is mounted (in a mounted state); if no, it is determined that the apparatus is not mounted (in a non-mounted state). (This detection operation will be called as mount detection.)

Then, substituting the "mounted state," "non-mounted state," and "mount detection" in the present embodiment into the "use state," "non-use state," and "use-state detection" in Embodiment 1, the operation of the present embodiment is the same as either one of the first, second, and third operation charts in Embodiment 1.

The present embodiment also uses both the use-state detecting means 9 and the controlling means 10, which are arranged in such a manner that if the information viewer does not set the display means mounting member on the head at start of use, the power supply to the entire apparatus is not effected; and even if the apparatus is once brought into the operating state and if the display means mounting member leaves the head of the information viewer, the supply of power is automatically stopped immediately, thereby preventing waste of power and then extending the operate time of the display apparatus.

If the present embodiment additionally has the display means with illuminating means, the attaching/detaching mechanism, or the image taking means and moving object detecting means with necessity, the apparatus can operate based on either one of the operation charts in Embodiment 2 to 4.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A display apparatus to be mounted on the head of an observer, comprising:

display means for displaying image information for both eyes of said observer;

use-state detecting means for detecting a use state and a non-use state about whether or not said observer is observing said display means;

portable power supply means for supplying power to each element in said display apparatus; and means for controlling said portable power supply means, based on a signal from said use-state detecting means.

2. The apparatus according to claim 1, wherein said use-state detecting means comprises means for detecting information concerning an eye of said observer.

3. The apparatus according to claim 2, wherein said information detecting means comprises means for detecting reflected light from a cornea of said observer.

4. The apparatus according to claim 1, wherein said use-state detecting means comprises means for detecting the use state a plurality of times at predetermined time intervals and determines the use state, based on a number of use states or non-use states detected.

5. The apparatus according to claim 1, wherein said controlling means starts supplying said power to all elements when said controlling means receives a signal indicating said use state from said use-state detecting means.

6. The apparatus according to claim 1, further comprising alarming means for generating an alarm signal to said observer, based on a signal indicating said non-use state from said use-state detecting means.

7. The apparatus according to claim 6, wherein after said alarming means gives an alarm and when after a lapse of a predetermined time therefrom a signal of non-use state is obtained from said use-state detecting means, said controlling means stops the power supply from said power supply means to all the elements.

8. The apparatus according to claim 1, wherein said display apparatus further comprises a main power switch and wherein if said main power switch is turned on, then said use-state detecting means performs use-state detection at the beginning.

9. The apparatus according to claim 1, wherein said controlling means stops power supply to a predetermined element when said controlling means receives a signal indicating the non-use state from said use-state detecting means.

10. The apparatus according to claim 1, wherein the display means comprises a first display for the left eye of the observer and a second display for the right eye of the observer.

* * * * *

UNITED STATES PATENT AND TRADEMARK OFFICE
CERTIFICATE OF CORRECTION

PATENT NO. : 5,635,948
DATED : June 3, 1997
INVENTOR(S) : Satoshi Tonosaki

It is certified that an error appears in the above-identified patent and that said Letters Patent is hereby corrected as shown below:

Column 6, line 55, after 20, insert --21--.

Signed and Sealed this

Twenty-sixth Day of August, 1997

*Attest:*

BRUCE LEHMAN

*Attesting Officer*   *Commissioner of Patents and Trademarks*